Nov. 14, 1950     E. E. MARTIN     2,529,808
VALVE DEVICE FOR PRESSURE FLUID CONTAINERS
Filed Sept. 24, 1946     2 Sheets-Sheet 1
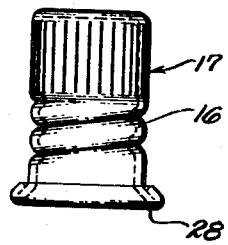
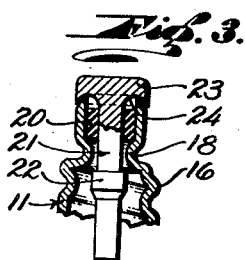
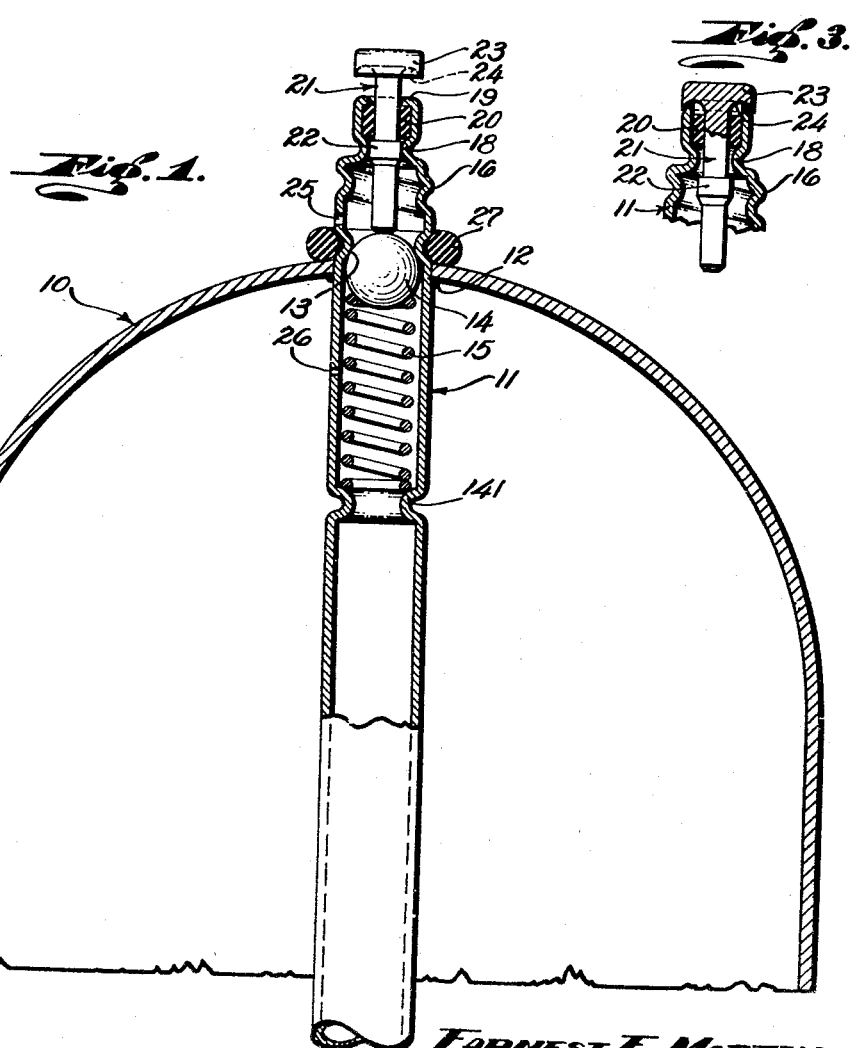
EARNEST E. MARTIN
INVENTOR.
BY
ATTORNEY Nov. 14, 1950  E. E. MARTIN  2,529,808
VALVE DEVICE FOR PRESSURE FLUID CONTAINERS
Filed Sept. 24, 1946  2 Sheets-Sheet 2

Earnest E. Martin
INVENTOR.

BY
ATTORNEY

Patented Nov. 14, 1950

2,529,808

UNITED STATES PATENT OFFICE 2,529,808

VALVE DEVICE FOR PRESSURE FLUID CONTAINERS

Earnest E. Martin, Pasadena, Calif., assignor to Universal Properties, Inc., Los Angeles, Calif., a corporation of California Application September 24, 1946, Serial No. 698,925

16 Claims. (Cl. 222—394)

This invention has to do with improvements in valve devices for pressure fluid containers, particularly of the type employing a siphon or filling and discharge tube, and adaptable for use typically as dispensing containers for high vapor pressure insecticides of the Freon aerosol type.

Specifically the invention is concerned with valve devices which are self-closing after the container is filled through its siphon tube, normally to seal the fluid escape therethrough, and which may be manually opened to release the fluid in a spray composed of finely divided particles. Valve devices of this type constitute the subject matter of my copending application Ser. No. 564,354, filed November 20, 1944, on "Filling and Dispensing Fitting," now abandoned.

The general object of the present invention is to reduce the check or self-closing valve and its control means to a form of such extreme simplicity and practicability, as will permit manufacture and assembly of the parts at a cost sufficiently low to warrant the sale and use of a container with a single charge. However, as will appear, the invention retains its advantages with respect to simplicity and economy in manufacture, for all purposes where a refillable container may be desirable.

More specifically, the invention has for its object to incorporate the valve and its control in or as a part of the siphon tube, all in a manner whereby it is made possible at minimum expense and with fewest parts, to assure fluid-tight valve closure and a simple mode of opening the valve to dispense the container charge.

In accordance with the invention, the siphon tube, extending through the top of the container, may be made in single or plural sections, with the valve, preferably in the form of a metal ball check, and its seating spring, contained in the tube and with the valve seating against a shoulder produced by deformation of the tube. By a simple rolling operation, the tube may be deformed at longitudinally spaced locations to form a pair of inside annular shoulders of curved cross-sectional shape, against one of which the valve seats to maintain a seal the tightness of which is assured by the extreme smoothness of the valve seat resulting from a rolling operation type deformation of the tube metal. The second shoulder supports the spring for engagement against the valve.

A further feature is the provision within the top of the tube, of a manually controlled valve release, preferably in the form of an axially movable stem engageable against the valve to displace it from its seat against the spring resistance. Fluid leakage about the stem is effectively prevented by a seal ring assured of tight retention and close association with the stem, by confinement of the seal between spaced shoulders resulting from deformation of the tube metal.

The abovementioned features and objects of the invention, as well as the details of certain typical and illustrative embodiments, will be more fully understood from the following description of the accompanying drawings, in which:

Fig. 1 is a sectional view illustrating the top portion of the container with a single section syphon tube and its contained control valve;

Fig. 2 illustrates a cap for application to the top of the tube;

Fig. 3 is a fragmentary sectional view illustrating the adaptability of the control stem for turning the tube metal inwardly of the seal ring;

Figure 4:
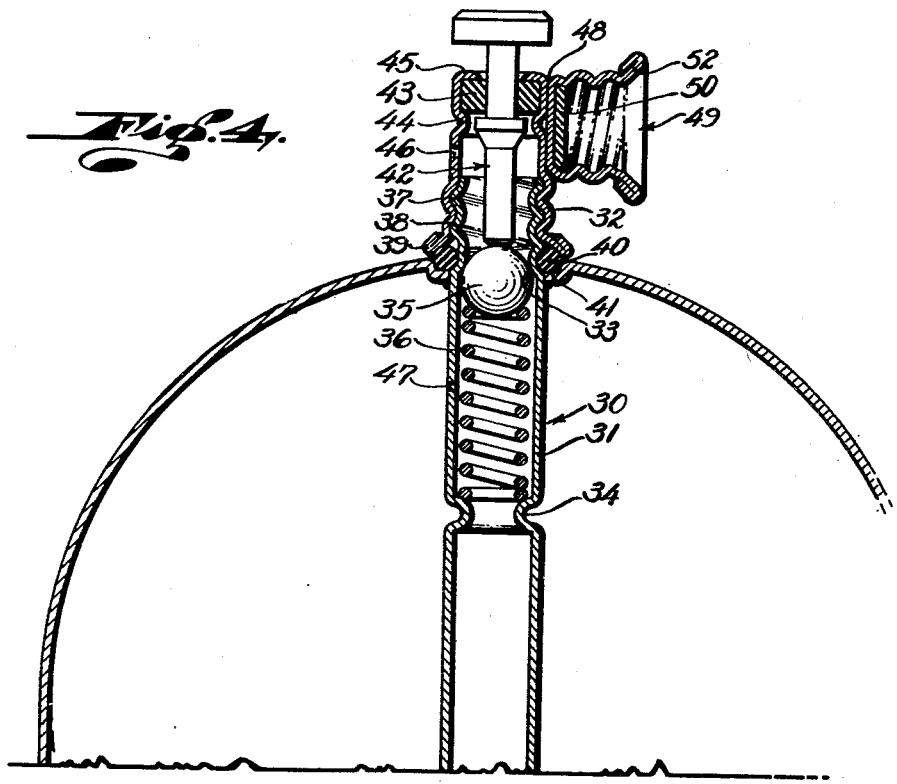
Fig. 4 is a view similar to Fig. 1 illustrating a variational form of the invention.

Referring first to Fig. 1, the container 10 may consist of a pressure vessel having any suitable shape and adapted to contain a one pound or less charge of high vapor pressure fluid such as a solution of an insecticide in dichlorodifluoromethane. The container is filled and its contents dispensed through a single section tube 11 formed for example of $\frac{3}{16}$ inch O. D. seamless tubing, the tube being attached to the container shell as by an annular braize at 12.

The wall of the tube is annularly deformed by simple rolling operations to form a pair of longitudinally spaced inside annular shoulders 13 and 14 of curved cross-sectional shape, substantially as illustrated. Shoulder 13 serves as a seat for the self-closing valve 14, preferably in the form of a metal ball check, the spherical surface of which engages the upward and inward curvature of the seat. Formation of the valve seat by a rolled type deformation of the tube metal, as distinguished for example from a cutting or grinding formation, has particular advantage in assuring normally a fluid-tight seal, in that the shoulder is formed in exact and uniform shape and is permitted to retain the extreme smoothness of the tube metal. The valve is thrust against the seat by coil spring 15 bearing at its bottom end against the lower shoulder 14I. In the process of thus rolling the tube and inserting the valve and spring, shoulder 13 may be first formed, the valve and spring then inserted, and shoulder 14I then rolled in the tube while maintaining the spring under compression, so that finally the spring and valve become interlocked between the shoulders as contained parts of the tube before its insertion in the vessel.

The top portion of the tube may be rolled at 16 to form a spiral thread for engagement by the rolled thread 16 of the cap 17, see Fig. 2. Above the thread 16, the tube is constricted and given rolled deformation to produce a pair of annular shoulders 18 and 19 between which is confined the seal ring 20. The tube contains an axially movable valve release stem 21 having an enlargement 22 to be guided within the shoulder 18, and an enlarged diameter head 23. As illustrated in Fig. 3, the head 23 may be utilized to form the shoulder 19 by giving the underside of the head a tapered concave surface 24 which, when driven down against the metal to form the shoulder 19 in its initial condition illustrated in Fig. 3 of the drawings, deforms the metal inwardly as a shoulder overlying the top of the seal ring 20.

When the valve 14 is unseated, the container fluid escapes through the tube 11 to a discharge orifice 25, formed for example by an 0.0225 inch drill, from which the fluid is dispersed as a finely divided fog or spray. A second orifice 26 of smaller size than the discharge opening 25, and formed for example by an 0.012 inch drill, extends through the wall of the tube below the valve 14 and above the liquid level in the container, to admit sufficient vapor to the stream leaving the container through the tube, to promote complete atomization of the particles expelled from the discharge orifice 25.

An annular seal ring 27, placed about the projecting portion of the tube 11 adjacent the vessel 10, and preferably about the concavity of the shoulder 13, is adapted to be compressed by the bottom flange 28 of the cap to form therewith a fluid-tight seal precluding the possibility of fluid leakage from the tube while the cap is in place.

The container may be charged with the pressure fluid by a suitable filling machine acting to depress the stem 21 to unseat the valve, the head of the filling machine being of a usual type engageable against the seal ring 27 so that the charge enters the container through orifice 25. Upon reception of the charge and removal of the filling head, valve 14 seats to seal the container. A secondary seal then may be effected by application of the cap against the seal ring.

When portions of the charge are to be dispensed for any periods of time, the cap is removed and the stem 21 manually depressed to unseat the valve for passage of the fluid to the discharge orifice. Upon release of the stem, the valve again seats to seal the container.

Figure 5:
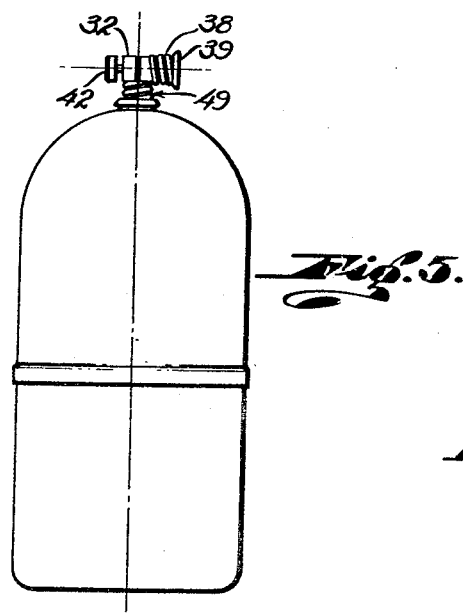
Fig. 5 is a reduced scale elevation showing the cap section of Fig. 4 in changed position.

The form of the invention shown in Figs. 4 and 5 is similar to the described embodiment, except that here the syphon tube 30 is made in sections 31 and 32 so that the latter may serve as a detachable positive seal cap containing the valve release stem. Section 31 is deformed to provide spaced inside shoulders 33 and 34 between which are confined the check valve 35 and spring 36, all as previously described. The adjacent ends of the tube sections are rolled to form interengaging threads 37 and 38 for attachment of section 32 as a removable cap in the position of Fig. 4. Here the outwardly turned flange 39 at the bottom of section 32 engages the annular seal ring 40 seated in the container recess 41 to maintain a fluid-tight seal. Section 32 contains the valve control stem 42 and its seal ring 43 confined between shoulders 44 and 45, all as previously described. With the parts thus positioned, depression of the stem 42 unseats the valve 35 to release the container fluid to the discharge orifice 46, the fluid stream passing to the orifice receiving vapor from the container through orifice 47. The tube section 32 is itself adapted to carry a sealing attachment by securing to the tube at 48 the threaded closure 49 containing gasket 50. Thus when the container is initially charged, in this instance by application of the filling machine head to the upper end of tube section 31 with section 32 removed, the container may be positively sealed as during shipment, by screwing the cap 49 onto the stem thread 37 in the position illustrated in Fig. 5. The cap flange 52 is tightened against the seal ring 40, and gasket 50 is pressed against the upper end of the tube section 31, to effectively preclude any fluid leakage from the container. When the charge is to be sprayed, the top tube section 32 is attached in the position of Fig. 4 to permit operation of the stem 42 to unseat the valve. It will be noted that the discharge orifice 46 and closure 49 are positioned at diametrically opposite sides of the tube so that the closure may serve as an indicator for the location of the discharge orifice and the direction in which the spray will be expelled therefrom.

I claim:

1. The combination comprising a siphon tube for pressure fluid containers, and a check valve in said tube, the entire thickness of the wall of the tube being annularly deformed to present an inside annular shoulder against which the valve seats to prevent fluid discharge from the container.

2. The combination comprising a siphon tube for pressure fluid containers, and a metal ball check valve in said tube, the entire thickness of the wall of the tube being annularly deformed to present an inside annular shoulder against which the valve seats to prevent fluid discharge from the container.

3. The combination comprising a siphon tube for pressure fluid containers, a check valve in said tube, the entire thickness of the wall of the tube being annularly deformed to present an inside annular shoulder against which the valve seats to prevent fluid discharge from the container, and a spring contained in said tube and urging the valve against said shoulder.

4. The combination comprising a siphon tube for pressure fluid containers, the entire thickness of the wall of the tube being annularly deformed at longitudinally spaced locations to present a pair of inside annular shoulders, a check valve seating against one of said shoulders to prevent fluid discharge from the container, and a spring engaging the other shoulder and the valve to urge the valve against its seat.

5. The combination comprising a metallic siphon tube for pressure fluid containers, the entire thickness of the wall of the tube being annularly curved inwardly at longitudinally spaced locations to present a pair of inside annular transversely curved shoulders, a ball check valve seating against one of said shoulders to prevent fluid discharge from the container, and a coil spring engaging the other shoulder and the valve to urge the valve against its seat.

6. The combination comprising a siphon tube for pressure fluid containers, a check valve in said tube, the entire thickness of the wall of the tube being annularly deformed to present an inside annular shoulder against which the valve seats to prevent fluid discharge from the container, a spring contained in said tube and urging the valve against said shoulder, and means carried by the outer end portion of the tube operable to unseat the valve to permit fluid escape through a discharge orifice.

7. The combination comprising a metallic siphon tube for pressure fluid containers, the entire thickness of the wall of the tube being annularly curved inwardly at longitudinally spaced locations to present a pair of inside annular transversely curved shoulders, a ball check valve seating against one of said shoulders to prevent fluid discharge from the container, a coil spring engaging the other shoulder and the valve to urge the valve against its seat, and means carried by the outer end portion of the tube operable to unseat the valve to permit fluid escape through a discharge orifice.

8. The combination comprising a siphon tube for pressure fluid containers, a check valve in said tube, the entire thickness of the wall of the tube being annularly deformed to present an inside annular shoulder against which the valve seats to prevent fluid discharge from the container, and a spring contained in said tube and urging the valve against said shoulder, an axially and manually movable stem contained in and extending beyond the outer portion of the tube and operable to engage and unseat the valve to permit fluid escape through a discharge orifice in the wall of the tube, and seal means preventing fluid leakage about said stem.

9. The combination comprising a siphon tube for pressure fluid containers, a check valve in said tube, the entire thickness of the wall of the tube being annularly deformed to present an inside annular shoulder against which the valve seats to prevent fluid discharge from the container, and a spring contained in said tube and urging the valve against said shoulder, an axially and manually movable stem contained in and extending beyond the outer portion of the tube and operable to engage and unseat the valve to permit fluid escape through a discharge orifice in the wall of the tube, the wall of the tube being deformed to present spaced annular inside shoulders about said stem, and a stem seal ring contained between the last mentioned shoulders.

10. The combination comprising a siphon tube having releasably interconnected body and cap sections, the entire thickness of the wall of the body section being annularly deformed at longitudinally spaced locations to present a pair of inside annular shoulders, a check valve seating against one of said shoulders to prevent fluid escape from the container, a spring engaging the other shoulder and the valve to urge the valve against its seat, and means carried by the cap section of the tube operable to unseat the valve to permit fluid escape through a discharge orifice in the tube.

11. The combination comprising a siphon tube having releasably interconnected body and cap sections, the entire thickness of the wall of the body section being annularly deformed at longitudinally spaced locations to present a pair of inside annular shoulders, a check valve seating against one of said shoulders to prevent fluid escape from the container, a spring engaging the other shoulder and the valve to urge the valve against its seat, an axially and manually movable stem contained in and extending beyond said cap section of the tube and operable to engage and unseat the valve to permit fluid escape through a discharge orifice in the tube, and seal means preventing fluid leakage about the stem.

12. The combination comprising a metallic siphon tube having body and cap sections, the entire thicknesses of adjacent end portions of said sections being deformed to form interengaging threads for releasably interconnecting the sections, the entire thickness of the wall of the body section being annularly deformed at longitudinally spaced locations to present a pair of inside annular shoulders, a metal check valve seating against one of said shoulders to prevent fluid escape from the container, a spring engaging the other shoulder and the valve to urge the valve against its seat, an axially and manually movable stem contained in and extending beyond said cap section of the tube and operable to engage and unseat the valve to permit fluid discharge through an orifice in the cap section, the wall of the cap section being deformed to present spaced annular inside shoulders about said stem, and a stem seal ring contained between the last mentioned shoulders.

13. The combination comprising a pressure fluid container, a siphon tube extending within and through the top of the container, a check valve in said tube and normally preventing fluid discharge from the container, the entire thickness of the wall of the tube being annularly deformed to present an inside annular shoulder against which the valve seats to prevent fluid discharge from the container, and a spring urging the valve against its seat.

14. The combination comprising a pressure fluid container, a siphon tube extending within and through the top of the container, the entire thickness of the wall of the tube being annularly deformed at longitudinally spaced locations to present a pair of inside upper and lower annular shoulders, a check valve seating upwardly against the upper shoulder, and a spring inside the container engaging the other shoulder and the valve to urge the valve against its seat.

15. The combination comprising a pressure fluid container, a siphon tube extending within and through the top of the container, the entire thickness of the wall of the tube being annularly deformed at longitudinally spaced locations to present a pair of inside upper and lower annular shoulders, a check valve seating upwardly against the upper shoulder, a spring inside the container engaging the other shoulder and the valve to urge the valve against its seat, a cap detachably secured to said tube outside the container, and means carried by said cap and operable to engage and unseat the valve to permit fluid escape from the container through a discharge orifice in the cap.

16. The combination comprising a pressure fluid container, a siphon tube extending within and through the top of the container, a check valve in said tube and normally preventing fluid discharge from the container, the entire thickness of the wall of the tube being annularly deformed to present an inside annular shoulder against which the valve seats to prevent fluid discharge from the container, a spring urging the valve against its seat, and means for unseating said valve, the wall of said tube containing a small orifice within the container below the valve and above a level of liquid in the container.

EARNEST E. MARTIN.

REFERENCES CITED

The following references are of record in the file of this patent:

UNITED STATES PATENTS

| Number | Name | Date |
| --- | --- | --- |
| 557,720 | Teahen | Apr. 7, 1896 |
| 656,417 | McIntyre | Aug. 21, 1900 |
| 710,674 | Fassmann | Oct. 7, 1902 |
| 1,304,301 | Fusner | May 20, 1919 |
| 2,185,290 | Bravo et al. | Jan. 2, 1940 |
| 2,351,376 | Ward | June 13, 1944 |